3,358,055
ALPHA-OLEFIN POLYMERIZATION PROCESS
Michael Erchak, Jr., Ridgewood, and Joseph M. Kelley, Westfield, N.J., assignors to Rexall Drug and Chemical Company, Los Angeles, Calif., a corporation of Delaware
No Drawing. Filed Feb. 20, 1964, Ser. No. 346,077
5 Claims. (Cl. 260—878)

This invention relates to a method for the polymerization of alpha-olefins by a novel process and embodies a concept for carrying out said polymerization which is an improvement over heretofore known methods of polymerizing said olefins with known catalysts.

In South African specification 62/5343 of December 19, 1962, the disclosure of which is incorporated herein by reference, there is disclosed a process for polymerizing propylene which consists of contacting propylene in a normally liquid diluent such as heptane with a catalyst which is produced by reacting metallic sodium, a titanium trichloride and tetrakis (dimethylamino) silane, the sodium metal being present in an amount sufficient to effect the extent of reduction requisite to impart full catalytic activity to the catalyst and further including a very minor amount of an organozinc compound which is added to the active catalyst formed as above in certain preferred mol ratios of organozinc compound to titanium trichloride.

The foregoing catalyst system produces a polymer of propylene of excellent physical properties such as high crystallinity, hardness, bending moduli and small particle size in the polymerization system disclosed. Thus, several examples wherein heptane is used as the diluent illustrate the preparation of solid predominantly isotactic polypropylene having hardness and stiffness properties noticeably superior to those of corresponding commercially available polymers of polypropylene. Attempts to repeat the preparation of polypropylene with the foregoing catalyst and using heptane as a diluent resulted in the production of polypropylene of exceptional physical properties as reported in the patent, but the polymerization rates were found to be low. For example, comparing the polymerization rates of this catalyst with a known violet titanium trichloride-aluminum diethyl monochloride propylene polymerization catalyst resulted in the latter producing several fold the amount of polymer produced by the catalyst in question under the laboratory conditions employed in this investigation. Since this novel catalyst as set forth in the South African patent indicated is capable of producing a polymer of outstanding physical properties, it is obvious that a process for increasing its activity to thereby make it more competitive and useful would be highly desirable.

It is an object of this invention to provide an improvement in a process for polymerizing alpha-olefins with the catalyst composition set forth above.

It is a further objective of this invention to provide a continuous process for preparing polymers of alpha-olefins by use of the catalyst set forth hereinabove.

A still further object of this invention is to provide a process for preparing block copolymers by an improved process to be set forth herein.

It has been found in accordance with the teachings of this invention that an improved process for polymerizing alpha-olefin monomers can be provided wherein as the catalyst there is used the reaction mixture obtained from a metallic alkali metal, a titanium trihalide and tetrakis (dialkylamino) silane and further in the presence of an organozinc compound, which comprises carrying out the polymerization reaction with the alpha-olefin monomer in the liquid form by maintaining a pressure in said reaction system of at least about 150 p.s.i.g. or sufficiently high to maintain the monomer in the liquid form and a polymerization temperature which may range from 50° to 192° F., the particular temperature and pressures being used at all times being sufficient to maintain the olefin in the liquid form. By the term "alpha-olefin monomer" there is intended to include ethylene, which can likewise be polymerized in liquid form. The process of this invention further includes preparation of a solid high molecule weight polymer of an alpha-olefin and subsequently polymerizing a block of a different alpha-olefin polymer or copolymer onto the preformed solid high molecular weight polymer. The block copolymerization reaction can be carried out in the vapor phase, although the use of hydrocarbon diluents (for more efficient heat transfer) may also be employed. A variety of copolymerizable monomers can be used, including ethylene, ethylene-propylene to form random copolymer blocks, polar monomers such as acrylonitrile, vinyl pyridine, methyl methacrylate and the like. Block copolymers can be incorporated in amounts of from as low as 1% or less to as high as 40% for the ethylene or ethylene-propylene type.

The subject catalyst as defined includes generically alkali metals, as well as titanium trihalides and tetrakis (dialkylamino) silanes. Of the alkali metals which can include sodium, potassium or lithium, the sodium metal is the preferred reducing agent and reference will be made hereinafter to this element. Also, while titanium trihalide encompasses the trifluorides, trichlorides, bromides and iodides, the preferred composition hereinafter indicated will be titanium trichloride. As for the tetrakis (dialkylamino) silane, the dialkylamino groups may include lower alkyls such as from 1 to 5 carbon atoms, reference being made hereinafter only to the methyl amino derivative of this compound.

As disclosed by the indicated South African patent, the catalyst combination of the three main catalytic ingredients above, while giving very good polypropylene polymer, can be improved by incorporating in the catalyst a "polymer structure modifier" which is an organozinc compound such as zinc diethyl, dipropyl, dibutyl, di(2-ethyl-hexyl) and the like. The polymer structure modifier according to that patent can be used in very small amounts, a preferred and useful range based on the titanium trichloride present being indicated as from .005 to .075 mol per mol of titanium trichloride. Larger amounts of the organozinc can be used, such as .125 or even .2 mol per mol of titanium trichloride, but as understood from the patent, the extra amount of zinc over and above the preferred upper limit of .125 mol probably serves no useful function and it is therefore not necessary to use such high quantities. Moreover, it is to be understood that the zinc compound, in fact, is not used as a "catalyst" compound per se since its function as clearly disclosed and illustrated is to modify the polymer formed in some manner not clearly understood, rather than as an active aid in the polymerization reaction.

The preferred titanium trichloride composition is the reaction product formed from titanium tetrachloride with aluminum metal and has the empirical formula $Ti_3AlCl_{12}$, which according to this invention will be simply illustrated by the formula: $(3TiCl_3 \cdot AlCl_3)$. This preferred composition is believed to be a true compound of all of the elements present. A specific and especially preferred form of this catalyst is indicated in U.S. Patent 3,032,510. The U.S. patent indicates that dry ball milling of the cocrystallized composition improves the activity of the catalyst considerably. For purposes of briefness throughout this specification, reference will be made to this titanium trichloride catalyst cocrystallized with aluminum chloride simply as titanium trichloride.

The three components of the active catalyst system, the sodium metal, the tetrakis (dimethylamino) silane, hereinafter referred to simply as TDSI and the titanium trichloride can be combined simultaneously or in any order and the temperature of the combination or mixing can range from −100° up to 150° C., but preferably from 20° to 100° C. The sodium should preferably be used in an amount of at least a 1:1 mol ratio relative to the titanium trichloride, the upper limit of sodium used not being critical. The TDSI can be used in very small amounts, such as from 0.01 to 10 gram-atoms of amino nitrogen in the alkyl aminated silicon compound per mol of sodium metal. As heretofore indicated, the polymer structure modifier, that is, the zinc dialkyl (which if substituted for the sodium is completely ineffective as a catalyst), can be used in the mol ratios heretofore indicated.

The catalyst including the three active components are prepared prior to polymerization or prepared in situ in the polymerization vessel. The organozinc compound can then be added after formation of the catalyst, or if desired, even during formation of the active catalyst. The polymerization reaction system involving this catalyst can further include small amounts of hydrogen in the polymerization mass, for example, amounts of .0001 to .05 mol of hydrogen per mol of monomer or higher to aid in the regulation of molecular weight of the polymer.

The improvement in the process for polymerizing alpha-olefin monomers with which this invention is concerned is in the use of the monomer(s) in the liquid phase so that the liquefied monomer(s) serve not only as the active polymerization ingredient(s), but also as the diluent(s) for the polymerization reaction. If desired, and employing the preferred pressures and temperatures, minor amounts of liquefiable gases such as propane or butane can be used in combination with liquid propylene, or alone, for example, to obtain better control of total solids in the polymerization reaction and/or to be able to separate solids from liquid diluent more readily than when using a normally liquid hydrocarbon diluent. While it is possible to use from, for example, 5 to 50% of a liquefiable gas such as butane, it is preferred specifically with this catalyst system to carry out the polymerization using the alpha-olefin monomer in the liquid phase without additional diluents and to maintain sufficient liquid monomer diluent in the reaction system and/or control the total percent solids in the system so that processing of the products formed does not become difficult.

It is relatively simple to determine the pressures to be used in order to maintain the monomers in liquid phase since as is known, ethylene will liquefy at a temperature below 9.6° C. at nominal pressures, while propylene at a temperature of about 20° C. liquefies when a pressure of around 150 p.s.i.g. gage is applied. To simplify the matter of what pressures are to be used in this process, the liquefaction pressure of propylene at normal or room temperatures will be used hereinafter as the preferred lower pressure useful in the polymerization reaction. This lower pressure, which as stated above is around 150 p.s.i.g., can be increased up to 1000 or higher, if desired. The preferred pressures, however, will be within the range of from 250 to 750 p.s.i.g., since at these pressures efficient handling of the polymerization reaction system is facilitated.

In view of the liquid phase nature of the polymerization reaction, and specifically in view of the preferred method for polymerizing alpha-olefins which involves a continuous process, the conversions for the preferred continuous method for polymerizing alpha-olefins are conversions of monomer to a total solids of from 15 to 30% in the liquid phase. Although higher or lower solids contents can be processed (percent solids is a function of residence time of the monomer under polymerization conditions), for most efficient operation, that is, agitation of solids as well as continuous removal as a slurry from the reaction vessel to a recovery system, the solids concentration indicated above is much preferred. Where the solids are removed as a slurry from the reactor system, a simple flashing operation will remove the monomer from the polymer and the monomer can thereafter be recycled to the system.

The amount of the titanium trichloride employed is not critical and from as low as .05 grams per liter to as high as 2 grams per liter per 100 ml. of liquid propylene or other alpha-olefin monomer can be employed in this reaction system.

In carrying out the polymerization reactions of propylene with the catalyst system herein employing normally liquid diluents such as heptane as the polymerization media, it was found that the three component catalyst was very sensitive to extraneous impurities, both in the monomer and the liquid diluent. Traces of oxygenated compounds including oxygen, moisture and similar materials affect this catalyst system noticeably. Thus, even though a diluent such as n-heptane might be sufficiently free of impurities and suitable for polymerization of propylene employing other catalyst systems, when used in the process disclosed by the South African patent above such heptane may not be adequately pure. By the process of this invention, it will be appreciated that elimination of extraneous diluents as preferred, eliminates sources of impurities which would otherwise affect the reaction rates. Using monomer only as the diluent medium improves the yield of polymer and polymerization rates. Where the reaction is carried out continuously, the lining out of the system by the continuous feeding of reaction ingredients as well as continuous removal of reaction product, noticeably increases the yield of polymer per gram (or pound) of catalyst used. Best results are obtained, therefore, where the reaction is kept continuous, since with proper precautions, very little, if any, extraneous impurities are introduced to the system. Where operation is carried out continuously, then economic polymerization rates are obtained, and this, coupled with the excellent properties of the polymer, results in a truly unique process for preparing alpha-olefin polymers such as those of polypropylene or block copolymers thereof.

In order to further illustrate the improved process of this invention, the following examples are presented, which examples include for comparison, polymerizations carried out using heptane as a diluent as contrasted to these using the monomer as the reactive component and as the diluent. For briefness, runs involving only propylene will be presented herewith, although as indicated heretofore, other alpha-olefin monomers can likewise be polymerized. Thus, block copolymerization run examples also offered herein demonstrate the polymerizability of ethylene onto a polypropylene preformed polymer containing active catalyst residues.

*Example 1*

In this example there is demonstrated the polymerization of propylene in a soda bottle using heptane as the diluent.

To a clean dry soda bottle there was added 200 cc. of purified normal heptane. After this 40 cc. of hydrogen was added via a syringe through a rubber lined and punched crown cap, and the following catalyst components: 0.8 cc. of 2.0 molar $TiCl_3$; 0.4 cc. of 1.0 molar TDSI; 0.8 cc. of 2.0 molar Na; and 0.4 cc. of .05 molar zinc diethyl. The bottle was then pressured up to 56 p.s.i.g. with propylene and placed in a bath at 40° C. On heating, the pressure rose to 65 p.s.i.g. After five hours, the pressure was 30 p.s.i.g. At this point, the bottle was vented and the reaction mixture quenched in isopropanol saturated with hydrogen chloride. The yield of polymer was 14.8 grams with a rate of polymerization therefore of 8.0 lbs./hr./lb. based on TiCl₃. Heptane insolubles measured 90.4%, and the melt flow at 230° C. was 10.31 grams/10 min. (ASTM D–1238–57T at 230° C.).

*Example 2*

This example illustrates a polymerization run carried out in an autoclave.

To a 1.0 liter stirred autoclave there was added 500 cc. of normal heptane that was previously titrated by a method that would show the impurities active toward the catalyst. The titration indicated a total impurity level of 6–7 p.p.m. To the autoclave was added 35 p.s.i.g. of propylene and 10 p.s.i.g. of hydrogen. After this there was added 2.0 cc. of 2.0 molar Na dispersion and the reactor stirred for 15 minutes. This was followed by the addition of 1.0 cc. of 1.0 molar TDSI; 2.0 cc. of 2.0 molar TiCl₃; and 1.0 cc. of .05 molar zinc diethyl. The reaction was stirred at 400 r.p.m. for five hours at 50° C. The yield of polymer was 33.0 grams which was at the rate of 9.0 lbs./hr./lb. based on TiCl₃. The heptane insolubles content measured 85% and the melt flow at 230° C. was 13.1 grams/10 min.

*Example 3*

This example represents a batch polymerization run in accordance with the process of this invention.

A 1.0 liter stirred autoclave was purged with dry nitrogen at 115° C. for one hour. After cooling to 25° C., 7.5 p.s.i. of hydrogen was added to the reactor, followed by 400 cc. of liquid propylene that had been dried by passing it over activated alumina. While the reactor was being stirred, 2.0 cc. of 2.0 molar sodium dispersion was added and the mixture stirred for 15 minutes at room temperature. Then 1.0 cc. of 1.0 molar TDSI; 2.0 cc. of 2.0 molar TiCl₃ and 1.0 cc. of 0.05 molar zinc diethyl were added. The reactor was heated to 65° C. and run for 5.0 hours. At the end of this time, the reactor was vented and the polymer collected and deashed. The polymer formed had a heptane insolubles content of 93% and was in very fine particle size form.

*Example 4*

This example demonstrates the preferred method of operation in accordance with the process of this invention.

A series of 17 consecutive batch polymerizations were made in a 1.0 liter stirred autoclave. Each run was made as follows: a partial pressure of 3 p.s.i. H₂ was put into the reactor, then 400 cc. of dried liquid propylene was added. To this was added 1.0–2.0 cc. of 2.0 molar sodium dispersion; 0.5–1.0 cc. of 1.0 molar TDSI; 1.0–2.0 cc. of 2.0 molar TiCl₃ and 0.5–1.0 cc. of .05 molar zinc diethyl. The ratio of catalyst components was always the same. The reaction was run at 65° C. for 1–2 hours per run. After each run, the reactor contents were discharged by venting to 0 p.s.i.g., adding 500 cc. of purified normal heptane and pressuring out the contents with N₂ via a dip tube. After this was done, the reactor was prepared for the next run. The yield increased from zero to 59 grams after three two-hour runs. Runs ten, eleven and twelve had rates of 51, 53 and 77 lbs./hr./lb. based on TiCl₃. The isotactic content for these latter runs was above 90%, with a melt flow of 0.3–0.7 grams/10 min. at 230° C. For the best runs, that is, after the reactor had fully dried out, the average rate was 50–75 lbs./hr./lb. based on TiCl₃. By comparison with the previous examples using heptane as the diluent, this catalyst system is most efficient when employed in a continuous operation. The overall average rate was four times as great as the best previous batch polymerization employing heptane as the diluent and in the later runs after the reactor had fully lined out the rate was even higher.

*Example 5*

An ethylene-propylene block copolymer, preparation is presented herewith.

The homopolymerization was as follows: 2.0 cc. of 2.0 molar Na dispersion, 1.0 cc. of .05 molar zinc diethyl, 1.0 cc. of 1.0 molar TDSI and 0.8 grams of TiCl₃ were added to a one liter autoclave which contained 5 p.s.i.g. H₂. To this was added 400 cc. of liquid propylene and the reaction run for 2.0 hours at 65° C.

At the end of 2.0 hours, the reactor was vented to 0 p.s.i.g., then a mixture of 75% propylene, 25% ethylene was added to the reactor taking a constant vent gas for 1.0 hour at 35 p.s.i.g. and 55° C. The yield was 30.0 grams of polymer which contained incorporated therein 28.0% ethylene. Molecular weight of this polymer was too high to measure the melt flow.

*Example 6*

An ethylene block copolymer was also prepared and the data are included herewith.

The homopolymerization was run as described for Example 5. At the end of 2.0 hours the reactor was vented to 0 p.s.i.g., then swept with ethylene at 5 p.s.i.g. and 55° C. for 1.5 hours. The yield was 29 grams. The percent ethylene incorporated was 15.2.

The molecular weight of both copolymers of Examples 5 and 6 was so high that the Izod impact test (no break) as a degree of property improvement could not be evaluated. By suitable process variations, however, including the use of proper amounts of H₂ to control molecular weight of the homopolymer, as well as variations in the amounts of block copolymers formed, a processable polymer was efficiently prepared in accordance with the teachings herein.

Resort may be had to modifications falling within the scope of this invention.

What is claimed is:

1. In a continuous process for polymerizing an alpha-olefin monomer which comprises contacting said monomer with a catalyst produced by mixing together a metallic alkali metal, a titanium trichloride cocrystallized with aluminum chloride and tetrakis (dialkyl amino) silane, the alkali metal being present in an amount sufficient to effect the extent of reduction requisite to impart full catalytic activity to the catalyst, the improvement which comprises carrying out the polymerization reaction with the alpha-olefin monomer in the liquid phase by maintaining a pressure of at least 150 p.s.i.g. and a polymerization temperature of from 50° to 192° F., in the presence of hydrogen in amounts of from .0001 to .05 mole of hydrogen per mole of monomer, said polymerization being carried out in the absence of any diluent.

2. In a process of polymerizing propylene monomer which comprises contacting said monomer with a catalyst produced by mixing together metallic sodium, a titanium trichloride cocrystallized with aluminum chloride and tetrakis (dimethyl amino) silane, the sodium metal being present in an amount sufficient to affect the extent of reduction requisite to impart full catalytic activity to the catalyst, and wherein an organozinc compound is added to said fully active catalyst in amounts of from 0.005 to 0.2 mol per mol of titanium trichloride, the improvement which comprises carrying out the polymerization reaction with the propylene monomer continuously in the liquid phase by maintaining a pressure of at least 150 p.s.i.g and polymerization temperatures of from 50° to 192° F., in the presence of hydrogen in amounts of from .0001 to .05 mole of hydrogen per mole of monomer, said polymerization being carried out in the absence of any diluent.

3. In a process for polymerizing ethylene, the improvement which comprises continuously contacting said ethylene, said polymerization being carried out in the absence of any diluent with a catalyst produced by mixing together a metallic alkali metal, a titanium trichloride cocrystallized with aluminum chloride and tetrakis (dialkyl amino) silane, the alkali metal being present in an amount sufficient to effect the extent of reduction requisite to impart full catalytic activity to the catalyst, and including an organozinc compound added to said fully active catalyst in an amount of from 0.005 to 0.2 mol per mol of titanium trihalide, said polymerization reaction being carried out while maintaining the ethylene in the liquid phase at a temperature of from about 50° to 192° F. in the presence of hydrogen in amounts of from .0001 to .05 mole of hydrogen per mole of monomer.

4. In a process for preparing block copolymers of alpha-olefin monomers, the steps comprising,
 (a) continuously contacting said alpha-olefin monomer with a catalyst produced by mixing together an alkali metal, a titanium "trichloride cocrystallized with aluminum chloride," and tetrakis (dialkyl amino) silane, the alkali metal being present in an amount sufficient to effect the extent of reduction requisite to impart full catalytic activity to the catalyst and including an organozinc compound added to said fully active catalyst in amounts of from 0.005 to 0.2 mol per mol of titanium trihalide, in the presence of hydrogen in amounts of from .0001 to .05 mole of hydrogen per mole of monomer.
 (b) carrying out said polymerization reaction, said polymerization being carried out in the absence of any diluent to form a high molecular weight polymer from said alpha-olefin monomer.
 (c) contacting said high molecular weight polymer from step (b) with a different olefin monomer, for a time sufficient to incorporate from about 1 percent by weight to as high as 40 percent by weight of said monomer onto the polymer formed in step (b).

5. The process of claim 4 wherein the block copolymer formed in step (c) is an ethylene-propylene random copoylmer.

References Cited

UNITED STATES PATENTS

| 3,193,360 | 8/1965 | Scoggin | 260—93.7 |
| 3,196,137 | 8/1965 | Cain | 260—94.9 |
| 3,301,921 | 1/1967 | Short | 260—878 |

FOREIGN PATENTS 601,560  2/1960  Italy.

MURRAY TILLMAN, *Primary Examiner.*

D. J. BREZNER, *Assistant Examiner.*